United States Patent [19]

Martin et al.

[11] Patent Number: 4,585,532

[45] Date of Patent: Apr. 29, 1986

[54] METHOD FOR USING ANODES HAVING $NiCO_2O_4$ CATALYST FOR THE ELECTROLYSIS OF POTASSIUM HYDROXIDE SOLUTIONS AND METHOD OF MAKING AN ANODE CONTAINING $NiCO_2O_4$ CATALYST

[75] Inventors: Ronald E. Martin, Tolland, Conn.; Paul A. Plasse, Blandford, Mass.

[73] Assignee: International Fuel Cells Corporation, South Windsor, Conn.

[21] Appl. No.: 727,471

[22] Filed: Apr. 26, 1985

[51] Int. Cl.$^4$ ............................................. C25B 1/02
[52] U.S. Cl. ............................. 204/129; 204/290 R; 204/291; 204/293; 427/226; 427/436
[58] Field of Search ........... 204/129, 291, 293, 290 R; 427/226, 436

[56] References Cited

U.S. PATENT DOCUMENTS

| | | | |
|---|---|---|---|
| 4,131,619 | 12/1978 | Pews | 260/505 E |
| 4,391,668 | 7/1983 | Armstrong | 204/290 R |
| 4,416,758 | 11/1983 | Tseung et al. | 204/290 R |
| 4,497,698 | 2/1985 | Bockris et al. | 204/129 |

OTHER PUBLICATIONS

Tseung, A. C., and Bevan, H. L., J. Materials Science 5, 604 (1970).
Tseung, A. C., Hobbs, B. S., Tantram, A.D.S. Electrochim Acta, 15, 473 (1970).
King, W. J. and Tseung, A. C., Electrochim. Acta. 19, 485, (1974).
Yeung, K. L. K. and Tseung, A. C., J. Electrochim. Soc. 125, 878 (1978).
"Oxygen Evolution on Semiconducting Oxides" by Tseung et al., Electrochemica Acta, 1977, vol. 22, pp. 31–34.
NASA Report CR-159807, FCR-1657, Contract No. NAS3-21257 titled "Advanced Technolgoy Light Weight Fuel Cell Program" by R. E. Martin dated 3/4/80.
NASA Report CR-165417, FCR-3045, Contract No. NAS3-21293 titled "Advnaced Technology Light Weight Fuel Cell Program" by R. E. Martin dated 3/4/80.

Primary Examiner—R. L. Andrews
Attorney, Agent, or Firm—A. Dean Olson

[57] ABSTRACT

Anodes having $NiCo_2O_4$ catalyst used in the electrolysis of water to produce hydrogen and oxygen result in anode voltage requirements of less than about 1500 millivolts at 100 milliamperes per square centimeter of anode area. Typically, oxygen evolving anodes comprised of lead or carbon steel are utilized in the electrolysis of water to produce oxygen resulting in high voltage requirements. Anodes containing $NiCo_2O_4$ catalyst require substantially reduced voltages and perform well in the conventional alkaline electrochemical production environment.

1 Claim, 1 Drawing Figure

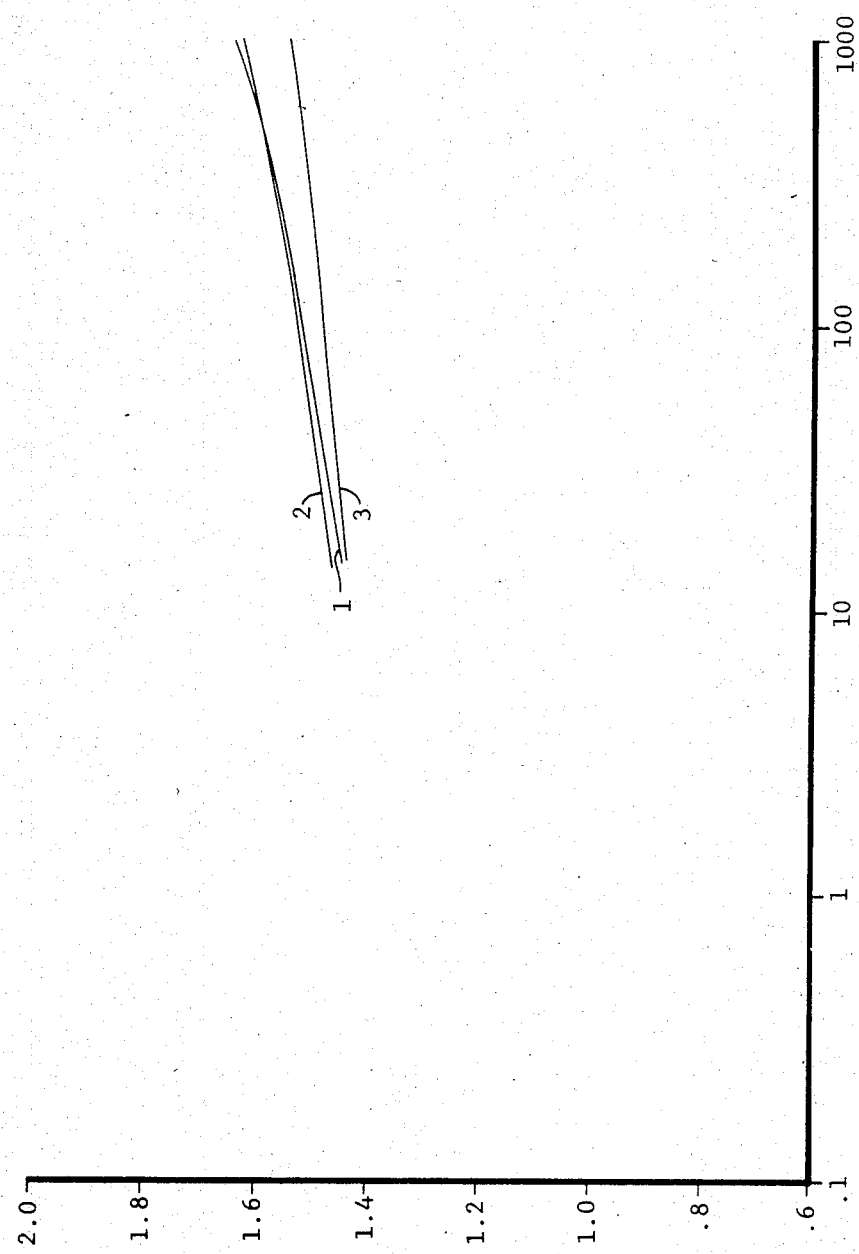

METHOD FOR USING ANODES HAVING NICO₂O₄ CATALYST FOR THE ELECTROLYSIS OF POTASSIUM HYDROXIDE SOLUTIONS AND METHOD OF MAKING AN ANODE CONTAINING NICO₂O₄ CATALYST

TECHNICAL FIELD

The field of art to which this disclosure pertains is electrodes for use in electrolysis processes, and particularly anodes, methods of using the anodes and methods of making the same.

BACKGROUND ART

One well known method for the preparation of oxygen and hydrogen involves the electrolysis of water. In the electrolysis process, hydrogen is produced at the cathode and oxygen is evolved at the anode. Empirically this can be illustrated as:

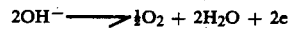

The thermodynamically electrochemical conversion efficiency is only partly realized in a practical electrochemical cell such as that illustrated above. Two basic losses are encountered: the ohmic loss and the electrode polarization, which is the deviation of the actual from the thermodynamic electrode potential. The electrode polarization is the result of the irreversibility of the electrode process, that is, the activation polarization and the voltage loss which develops from concentration gradients of the reactants.

Typically the anode reaction, oxygen evolution, is done on a porous nickel anode. In a potassium hydroxide electrolyte environment, the anode reaction is characterized by high polarizations of about 1598 to about 1740 millivolts (mv) at current densities of about 100 to about 1000 milliamps per square centimeter (ma/cm²) of electrode area. Other conventional anodes employed in the electrolysis of water to form oxygen result in cells that exhibit low electrochemical conversion efficiencies necessitating large voltage requirements. The high voltage requirements contribute to significant cell power consumption (IE).

Accordingly, there is a constant search in the art for processes that electrolize water to produce hydrogen and oxygen that result in reduced cell power consumption.

DISCLOSURE OF INVENTION

This discovery is directed at a low energy method of electrolyzing water to produce hydrogen and oxygen in an electrochemical cell. The cells contain an anode, a cathode, and aqueous potassium hydroxide electrolyte. The electrolyte solution is maintained in contact with the cathode and the anode. A supply of water is maintained in contact with the cathode and a supply of hydroxyl ion is maintained in contact with the anode. A direct electric current is passed through the system causing water to be reduced to hydrogen at the cathode and hydroxyl ions to be oxidized at the anode. The anode is comprised of a NiCo₂O₄ catalyzed electrically conductive substrate. This process results in an anode voltage requirement of less than about 1445 mv at 100 ma/cm² of anode area and a nearly linear voltage-current out to 1000 ma/cm².

Another aspect of this invention is a method of making a cathode for use in an electrochemical system in cells that contain electrolyte, an anode and a cathode. The cathode is made by impregnating an electrically conductive porous substrate with NiCo₂O₄.

This discovery provides a significant advancement to electrochemical technology. Electrochemical processes that utilize anodes containing NiCo₂O₄ catalyst for the reduction of water to produce oxygen require lower anode voltages resulting in significant energy savings.

Other features and advantages will be apparent from the specification and claims and from the accompanying drawing which illustrates an embodiment of this invention.

BRIEF DESCRIPTION OF DRAWING

The FIGURE illustrates comparative voltages for anodes containing NiCo₂O₄ catalyst of the present invention and anodes containing other catalysts typical of the prior art.

BEST MODE FOR CARRYING OUT THE INVENTION

Generally any conductive electrode material compatible with the aqueous potassium hydroxide electrolyte system and an oxygen evolution environment can be used to make the anode, preferably a porous substrate. It is epecially preferred that the substrate is a ribbed porous substrate as that provides an oxygen flow field resulting in the simplification of cell design. The preferred material comprises a metal substrate and it is especially preferred that the substrate is a porous nickel substrate. However, a porous plastic substrate impregnated with a conductive metal coating may also be utilized in the practice of this invention.

It is believed that the porous nature of the substrate effects reaction throughout the substrate resulting in the reabsorption of electrolyte within the cell. If the reaction were to occur at the surface, a mist of oxygen and electrolyte would escape the surface resulting in the loss of electrolyte from the cell. This reduces cell life. In addition, as the electrolyte condenses external to the cell, it causes corrosion. The porous substrate offers an additional benefit. It provides a storage volume for any electrolyte that may be expelled from the cell because of operational mishandling (including pressure imbalances) and electrolyte volume swings, that occur during startup, operation and shutdown of the cell.

The porous metal substrate described above may take the form of a porous material or a fine wire screen material. Conventional fine wire screen substrates are about 2 mils to about 10 mils thick with a preferred thickness of about 4.5 mils to about 5.0 mils. The mesh size is about 50 mesh to about 200 mesh preferable 100 mesh. Mesh size refers to the number of wires per linear inch in each axis. The porous nickel substrates are about 10 mils thick to about 100 mils thick with a preferred thickness of about 50 mils to about 70 mils. Typical rib widths and channel space widths are approximately 60 mils. The pore sizes of a porous nickel substrate range from about 17 microns to about 68 microns with a preferred pore size of about 34 microns. Porosities range from as low as about 17% to as high as about 90%, preferably about 70%. Metal substrates are generally commercially available, such as "Feltmetal" ®FM1211 porous nickel structures available from the Technetics Division, Brunswick Co., Deland, Fla.

A porous plastic substrate can be fabricated from any resin material compatible with this particular environment. It is preferred that the resin is a thermoplastic. It is especially preferred that the resin is a polysulfone such as UDEL ®P-1700 polysulfone available from Union Carbide. The porous plastic substrate can be plated throughout with any electrically conductive material preferably a metal such as nickel, gold or silver with a flash (thin plating) of about 0.05 mil to about 0.5 mil preferably about 0.2 mil. It is especially preferred that the plastic substrate is plated with nickel.

The porous plastic substrate described above is generally about 10 mils to about 100 mils thick preferably about 30 mils to 70 mils thick. The pore size of the plated substrate ranges from about 0.2 micron to about 17 microns with a preferred pore size of about 3 microns to about 8 microns. Porosities range from as low as 20% to as high as about 90%, preferably about 70%. The specific gravity of the substrate at the preferred porosity is about 1.46 grams per cubic centimeter (gms/cc). The minimum compressive strength of the plated plastic substrate is about 200 pounds per square inch (p.s.i).

The porous plastic substrate can be made by any process which results in a substrate having the above described characteristics such as the exemplary process described as follows. Fine particulates which contribute to a substrate with a pore size range of about 3 microns to about 8 microns are fabricated by spraying a solution of ground polysulfone resin pellets of about 0.125 inch in diameter and methylene chloride into a large container and allowing the particulates to develop on the liquid surface. The resultant particulates of about 25 microns in diameter are separated by decanting and drying and then graded by sieve. The substrate is formed in a mold by molding a slurry of the particulates and alcohol or another suitable solvent. With this approach, substrates with a thickness up to 100 mils and a pore size distribution of about 0.2 micron to about 17 microns can be fabricated. Following sintering at 200° C., the substrate is electroplated (impregnated throughout the porous substrate) to enhance electrical conductance. Conventional commercial electroplating processes and solutions may be used in the practice of this invention.

Optionally, the substrate can be wetproofed with from about 2 to about 10 milligrams per square centimeter (mg/cm$^2$) of PTFE TM polytetrafluoroethylene Dupont DeNemours, Inc. or fluorinated ethylene-propylene.

The conductive electrode substrate supports a NiCo$_2$O$_4$ binder layer typically referred to as the catalyst layer. Preferably, however, the conductive porous substrate either metal or plated plastic is impregnated with the NiCo$_2$O$_4$ catalyst eliminating the need for the binder containing separate layer. Any process resulting in a porous substrate impregnated with NiCo$_2$O$_4$ may be used to impregnate the substrates, however, the following process is preferred.

Nickel nitrate hexahydrate and cobalt II nitrate hexahydrate are combined in a molar ratio of respectively about 1/1 to about 1/4, preferably about 1/2 to form an aqueous solution. The conductive porous substrate is soaked in the solution for about 40-60 hours, preferably about 48 hours at ambient temperature. The catalyst impregnated substrate is air dried and sintered at approximately 300°-400° C., preferably about 350° C. for about 10-20 hours in an air atmosphere.

In the alternative process in which the catalyst is layered onto the substrate typically a binder and catalyst described as follows are required. Generally, any binder that is compatible with the aqueous potassium hydroxide electrolyte system can be used, preferably a fluorocarbon polymer with a molecular weight greater than 10$^6$. It is especially preferred that the binder is a PTFE polymer. Generally the mixture is about 20% to about 80% binder, preferably 25%, and about 80% to about 20% catalyst, preferably 75%. The catalyst loading is about 10 milligrams to about 50 milligrams, preferably about 20 mg/cm$^2$ of anode area. Typical catalyst layers are about 1 mil to about 5 mils, preferably about 2.5 mils in thickness, and the mean pore diameter is about 0.1 micron to about 5 microns, preferably about 1 micron.

The catalyst layer described above is applied to the substrate in any suitable method such as those conventional in the art, e.g., vacuum filtration. Thus an aqueous 60% weight solids PTFE dispersion is dispersed with the NiCo$_2$O$_4$ resulting in about 2% to about 10% solids, preferably about 5% solids. After ultrasonic blending for a few minutes, the solution is filtered on number 50 Whatman filter paper available from Whatman Ltd., England at 2 inches to 6 inches of mercury vacuum. After the excess liquid is drawn off with vacuum filtration, the catalyst/PTFE polymer coated filter paper is pressed onto a fine-wire screen substrate or porous metal substrate at about 200 p.s.i. to about 1000 p.s.i. The coated substrate is sintered at 320° C. for about 10 minutes.

The anodes described above are utilized in conjunction with conventional cathodes particularly those used for the electrolysis of water to produce hydrogen and oxygen. These cathodes include electrodes made from platinum, zinc, carbon steel, titanium, nickel, palladium, rhodium, lead, gold, silver and cobalt.

These anodes may be used with conventional electrolyte systems preferably those used in the electrolysis of water to produce hydrogen and oxygen and it is especially preferred that an aqueous potassium hydroxide system to used. In addition, the method of making an anode can be used to make anodes suitable for use with other electrolytes such as those used in the adiponitrile industry. Typically, additives such as corrosion inhibitors can be added to the electrolyte system.

Conventional electrochemical cells and electrolysis processes are described in (a) Potler, Edmund C., *Electrochemistry, Principles and Aplications*, Clever-Hume Press Ltd., London, 1956 and (b) Bard, Allen J., and Faulkner, Larry R., *Electrochemical Methods, Fundamentals and Applications*, John Wiley and Sons, New York, 1980, which are incorporated by reference. In this process the electrolyte solution is maintained in contact with both electrodes in order to complete the electrical circuit. In the adaptation of this process as disclosed in this application, hydroxyl ions are supplied to the anode utilizing technology conventional to the electrolysis fuel cell art, such as diffusion through the electrolyte from the cathode compartment. Water is supplied to the cathode by conventional means, for example, circulating a fluid stream containing water and dissolved salts to the cathode compartment of the reaction cell. It is preferred that the hydroxyl ions and water are continually supplied to the respective electrodes as the electrolysis products are removed, resulting in a continuous vs. a batch process. When electric currents of about 10 ma/cm$^2$ to about 1000 ma/cm$^2$ are passed across the electrodes, electrolysis occurs. At the cathode water is reduced to hydrogen; empirically this is illustrated as $2H_2O + 2e^- \rightarrow H_2 + 2OH^-$. At the anode of this invention, hydroxyl ions are oxidized. This can be empirically illustrated as $2OH^- \rightarrow \frac{1}{2}O_2 + H_2O + 2e^-$. Typical yields based on water range between about 60% to about 90%.

EXAMPLE I

A Pyroceram ™ (Corning Glass Works Co.) dish was placed in an oven located in a vented fume hood at 350° C. and heated to 350° C. 29 grams $Ni(NO_3)_2 \cdot 6H_2O$ and 58 grams $Co(NO_3)_2 \cdot 6H_2O$ were added to a beaker and melted at 135° C. for approximately 30 minutes. The melted solution was poured quickly in a very thin layer onto the 350° C. Pyroceram dish which was heated in air for 2½ hours at 350° C. It was then allowed to cool and the product was sifted through a 100 mesh screen and heat treated for 2 hours at 350° C. This process yielded 23.9 grams of a nickel cobalt spinel catalyst ($NiCo_2O_4$). Three grams of spinel catalyst is sufficient for 130.6 cm$^2$ of electrode active area.

Three grams of the $NiCo_2O_4$ catalyst was blended ultrasonically with 80 milliliters (mls) water at 200 watts for two minutes. 1.0 grams (on a dry solids basis) PTFE T-30 binder (Dupont de Nemours, E. I., Co.) solution was added and blending continued for one minute. In this invention, a porous nickel Feltmetal FM1211 substrate obtained from Technetics was used as a substrate. The substrate was obtained as a flat sheet that was about 72 mils thick. On one flat surface a rib pattern was machined about 42 mils deep.

On the flat surface a 60% solids aqueous TFE-30 polymer dispersion was dispersed with the $NiCo_2O_4$ (about 5% solids). After being ultrasonically blended for a few minutes, the solution was then filtered onto number 50 Whatman filter paper at about 2 to 6 inches vacuum. After the excess liquid was drawn off, the catalyst/TFE polymer coated filter paper was placed catalyst/TFE polymer side down on top of the flat side of the nickel feltmetal and then rolled. This transferred the catalyst/TFE polymer to the substrate. The part was then air dried and sintered at 320° C. for about 10 minutes.

EXAMPLE II

The $NiCoO_2$ catalyst can be impregnated into the porous metal substrate. A porous Feltmetal FM1211 nickel sheet machined with a rib pattern on one surface forming a gas flow field was immersed in an aqueous solution consisting of 14.5 gms $Ni(NO_3)_2 \cdot 6H_2O$ and 29.0 gms $Co(NO_3)_2 \cdot 6H_2O$ in 30 ml distilled water. The substrate was soaked in the solution for 48 hours at ambient temperature. Following the soak, the substrate was air dried and then sintered at 350° C. for 16 hours in an air atmosphere in a vented flume hood.

This electrode was tested in an aqueous solution comprising potassium hydroxide. A test of the electrode in a typical electrolyte solution used in an electrolysis process is sufficient to demonstrate the effectiveness of an electrolysis process that utilizes that anode, as the anode is independent of the rest of the cell.

The results of performance evaluation of anodes for electrolysis cells are incorporated onto the FIGURE. In the FIGURE the X axis represents cell current density. This is plotted against anode voltage (y) in (mv). The anode voltage is not an absolute term, it is measured against a hydrogen electrode in the same solution which is used as a reference electrode (HRE). The voltage of the HRE is assumed to be zero. The point 1.23 volts is the theoretical voltage required to evolve oxygen from the anode. Curve 1 illustrates the actual voltage required to evolve oxygen from a platinum black catalyst electrode, fine-wire substrate in a solution of KOH the typical electrolyte used in cells to electrolyze water. The oxygen evolution data points were taken by the inventors during the evaluation of $NiCo_2O_4$ anode catalyst layers. The difference between the curve and the 1.23 volts is the polarization which is defined as the excess of observed decomposition voltage of an aqueous electrolyte over the theoretical reversible decomposition voltage. In contrast to curve 1, curve 2 illustrates the voltages required for an oxygen evolving anode containing $NiCo_2O_4$ in a similar electrolyte solution. The $NiCo_2O_4$ employed in the electrode for curve 2 was prepared by a method contained in the literature. It is believed that the less efficient values associated with Curve 2 are a result of internal resistance. Curve 3 shows the voltage required to evolve oxygen from an electrode incorporating $NiCo_2O_4$ catalyst as prepared by the Example I method contained in this invention. As an example, at 100 ma/cm$^2$ of electrode area there is a voltage requirement of less than about 1470 mv compared to the voltage of about 1510 mv required for the platinum catalyst presented on curve 1. For the $NiCo_2O_4$ containing anode the overvoltage is the difference between the HRE (X axis) and 1.232 volts. A comparison of curve 1 and curve 3 at a specific current density clearly illustrates the lower voltages required by the $NiCo_2O_4$ containing anode prepared under this invention.

These cells make a significant contribution to electrochemical technology, particularly the chemical industry by incorporating energy saving anodes containing $NiCo_2O_4$ catalyst. The power consumption for the electrolysis of water to produce hydrogen and oxygen depends on the voltages required for the anode and cathode reactions. Typical anodes used in the electrolysis processes require close to 2.0 volts at 100 ma/cm$^2$. By contrast, the electrolysis processes of this invention incorporates anodes requiring voltages of close to 1.5 volts, a savings of about 0.5 volt.

The $NiCo_2O_4$ catalyst anode employing nonplatinum metals results in significant cost savings. Also, the ribbed porous nickel substrate provides a rigid catalyst support and a design feature with the oxygen flow field integral to the electrode. This approach contributes to a simplification of cell design. In addition, the ribbed porous nickel substrate can be obtained in any size required for electrolysis cell appliction. Electrolysis cell active areas in excess of 5 square feet are possible.

Furthermore, these anodes can be made by the simple process of impregnating an anode with catalyst which is in marked contrast to many other elaborate and expensive techniques that have been used to make electrolysis cell anode catalysts.

The porous substrate offers storage volume for electrolyte expelled during operational mishandling of the electrolysis cell. This feature promotes cell operational life by making the cell tolerant and promotes system life by keeping the electrolyte within the cell preventing corrosion of system components.

It should be understood that the invention is not limited to the particular embodiments shown and described herein, but that various changes and modifications may be made without departing from the spirit and scope of this novel concept as defined by the following claims.

We claim:

1. A method of electrolyzing water to produce oxygen and hydrogen in an electrochemical system in cells that contain aqueous potassium hydroxide electrolyte, an anode and a cathode comprising:
   (a) maintaining aqueous electrolyte in contact with the cathode and the anode;
   (b) maintaining a supply of water at the cathode;
   (c) maintaining a supply of hydroxyl ions at the anode; and
   (d) passing a direct electric current through said system causing reduction of the water to hydrogen at the cathode and oxidation of the hydroxyl ion to oxygen at the anode;
   wherein the improvement comprises utilizing as the anode a $NiCo_2O_4$ catalyzed electrically conductive substrate made by soaking the substrate in a solution of nickel nitrate hexahydrate and cobalt II nitrate hexahydrate and then sintering the impregnated substrate said electrolysis requiring an anode voltage of less than about 1470 millivolts at 100 milliamperes per square centimeter of anode area.

* * * * *